United States Patent [19]
Hochbach

[11] 3,713,297
[45] Jan. 30, 1973

[54] PROCESS FOR THE RAPID CONSOLIDATION OF MOIST SOIL

[75] Inventor: Friedrich Hochbach, Glinde, Germany

[73] Assignee: Reichhold-Albert-Chemie Aktiengesellschaft, Hamburg, Germany

[22] Filed: June 17, 1971

[21] Appl. No.: 154,158

[30] Foreign Application Priority Data

June 19, 1970 Germany.....................P 20 30 217.4

[52] U.S. Cl. .....................................61/36 R, 94/25
[51] Int. Cl. ................................................E02d 3/12
[58] Field of Search ...............61/36; 94/25; 166/295; 252/194

[56] References Cited

UNITED STATES PATENTS

| 3,367,892 | 2/1968 | Jorczak et al.........................61/36 X |
| 2,191,652 | 2/1940 | Hamilton..................................61/36 |
| 2,801,983 | 8/1957 | Dixon et al. ..........................61/36 X |

Primary Examiner—David J. Williamowsky
Assistant Examiner—David H. Corbin
Attorney—Allison C. Collard

[57] ABSTRACT

The subject of the invention is a process for shaping and rapidly consolidating moist soil, characterized in that the moist soil is mixed with an excess amount of water-absorbent pulverulent varieties of gypsum for such period of time that a crumbly mixed product is obtained, which is then mixed with a mixture of polymerizable unsaturated polyesters, hardeners and accelerators to give a mass which can be shaped, and that this mass after being shaped does consolidate relatively fast.

7 Claims, No Drawings

PROCESS FOR THE RAPID CONSOLIDATION OF MOIST SOIL

BACKGROUND OF THE INVENTION

1. Field of the Invention

In the case of natural disasters, military maneuvers and the like it is frequently desirable to allow helicopters to land in moist terrain or to erect parking lots or to provide a road for heavy earth-moving vehicles or artillery, rocket launching sites and platforms for radar sets. The customary hydraulic binders which could be considered for consolidating the soil suffer from the great disadvantage that they require a relatively long time to harden. Many organic binders are unsuitable, since they do not show satisfactory hardening times in the presence of moisture or since they cannot be mixed fast enough without the aid of emulsifiers and/or wetting agents.

It is the task of the present invention to close this technological gap and to provide a process in which a consolidation of moist soil can be effected within about 1 – 2 hours and at the same time the soil can beforehand be shaped so durably that it meets the requirements made of it as a helicopter landing place, parking lot, road, foundation and the like.

2. Prior Art

Comprehensive data on water-absorbent gypsum are to be found in Ullmanns Encyklopadie der technischen Chemie (Ullmanns Encyclopaedia of Industrial Chemistry) (published by Urban & Schwarzenberg, Munich, Berlin 1957), 3rd. edition, volume 8, pages 97 – 133, and especially on page 119.

A range of varieties of water-absorbent gypsum can be employed for the process of the invention, such as anhydrite, hemi-hydrate plaster of all occuring modifications, alone or in mixture, but above all those varieties of gypsum are employed which can absorb large amounts of water; the employed varieties of gypsum are made to harden in a period of 3 to 20 minutes after being mixed with the moist soil, depending on the machines used, a variety of gypsum being preferred which hardens to crumbs 3 to 5 minutes after being mixed with the soil.

The production of the crumbly mixing product of moist soil and water-absorbent gypsum can be adjusted to the properties of the components to be mixed and also to the mixing machines being present. Hereby it can be suitable to add known retarding agents for setting of the gypsum. These retarding agents are being described as glutinous colloidal additives in Kirk-Othmer, Encyclopaedia of Chemical Technology, 2nd edition, Interscience Publishers, New York, 1964, volume 4, page 23.

Ullmanns Encyklopadie der technischen Chemie, 3rd. edition, Urban & Schwarzenberg, Munich, Berlin, 1957, volume 8, page 115 – 116 and 122, gives a listing of organic retarding agents being used for the production of hard-gypsum such as ceratine and fish glue, for instance.

If, however, gypsum should accept water more readily special accelerators for setting have to be added to the soil-gypsum mixture. These accelerators are being described in Ullmanns Encyklopadie der technischen Chemie, 3rd. edition, Urban & Schwarzenberg, Munich, Berlin, 1957, volume 8, page 122. There are salts of inorganic acids, alkali and water-glass described as setting accelerators being effective already in very small concentrations.

The amounts of water-absorbent gypsum to be added to the soil in order to obtain a crumbly product depend on the water content of the soil which is to be shaped and consolidated. The amount of water-absorbent gypsum added therefore varies, depending on the water content of the soil, between 5 and 100 parts by weight relative to 100 parts by weight of the moist soil to be treated. For an 18 parts by weight water content relative to 100 parts by weight of the soil which is to be shaped and consolidated, for example, 410 parts by weight of water-absorbent gypsum are required per 500 parts by weight of moist soil.

Detailed data on unsaturated polymerizable polyesters are given in Ullmanns Encyklopadie der technischen Chemie (Ullmanns Encyclopaedia of Industrial Chemistry), 3rd. edition, volume 14, pages 87 – 105. These are predominantly manufactured from unsaturated carboxylic acids, dialcohols and, if desired, polyalcohols, in a known manner, and contain at least one copolymerizable monomer.

The weight ratio required for curing a mixture of soil and gypsum, relative to the mixture of unsaturated polyesters, catalysts and accelerators is: soil-gypsum mixture : unsaturated polyester = 3 : 1 to 10 : 1, a weight ratio of 5 : 1 being used preferentially.

Detailed descriptions of hardeners and accelerators as reaction agents in unsaturated polyesters are to be found in the book "Glasfaserverstarkte Kunststoffe," (glass-fiber reinforced artificial resins) published by Peter H. Selden, Springer Verlag, Berlin Heidelberg, New York, 1967, pages 83 –113.

It is known to harden unsaturated polyester resins (UP-resins) in the presence of radical donors, especially peroxides, by heating. Curing at lower temperatures, even at room temperature, can be carried thru in the presence of accelerators, especially of heavy metal salts and tert. aromatic amines respectively.

It is furthermore known to employ a combination of metal accelerators and tert. aromatic amines as promotors by which a faster curing is brought about.

Tert. aromatic amines alone are used for curing of UP-resins in the presence of diacylperoxides at room temperature. The U.S. Pat. No. 2,449,299 describes the employment of secondary aromatic amines together with diacylperoxides for cold-curing of UP-resins.

The Austrian Pat. No. 288,708 describes an specially efficient method for curing unsaturated polyester resins which, if necessary, contain up to 50 percent tar and/or usual fillers and/or epoxy resins. This method is also described in the British Pat. No. 1,226,688.

A further suitable method for curing unsaturated polyester resins is given by the Austrian Pat. No. 288,707 which method for curing of polyester resins containing inhibitors, fillers and other additives in usual amounts and by adding peroxidic catalysts is characterized in that mixtures of peresters and tertiary hydroperoxides in the weight ratio of 90 : 10 to 10 : 90 are used as curing catalysts.

The technically most important catalysts or hardening agents which lower the polymerization temperature needed are hydroperoxides and organic peroxo compounds being described in Ullmanns Encyklopädie der technischen Chemie, volume 14, 3rd. edition, Urban & Schwarzenberg, Munich, Berlin, 1963, on page 114. On page 115 tertiary amines and heavy metal salts are listed as activators.

SUMMARY

The subject of the invention is a process for shaping and rapidly consolidating moist soil, characterized in that the moist soil is mixed with an excess amount of water-absorbent pulverulent varieties of gypsum for such period of time that a crumbly mixed product is obtained, which is then mixed with a mixture of polymerizable unsaturated polyesters, hardeners and accelerators to give a mass which can be shaped, and that this mass after being shaped does consolidate relatively fast.

EXAMPLES FOR SUITABLE HARDING AGENTS AND ACCELERATORS

Hardening agents:
  A.: diacylperoxides, such as dichlorobenzoylperoxide, preferably benzoylperoxide. These are preferably used in desensitized state as paste or powder or liquid.
  B.: ketone peroxides, such as methylethylketone peroxide, methylisobutylketone peroxide, cyclohexane peroxide, acetylacetone peroxide. These are preferably used in the known desensitized liquid state.

Calcium sulfate in the dry state is a usual solid desensitizer for peroxides in order to obtain pulverulent products. Alkylbenzenes, trialkylphosphate and plasticizers based on phthalate are used as desensitizer for liquid and pasty compositions.

Accelerators:
  A.: based on tertiary amines, such as dimethylaniline, diethylaniline, dimethylparatoluidine are suitable. These are preferably used together with styrene or phthalate as desensitizer.
  B.: based on cobalt (2) salts, preferably cobalt octoate or cobalt naphthenate. These are also preferably used in desensitized state as aqueous solution of the concentration of 0.5 to 10.0 percent by weight, preferably 1 percent by weight of metal content.
  C.: based on vanadium salts, such as vanadyl-p-toluenesulfonate, in aqueous solution having a metal content of 1 percent by weight.

Hardening agents of the group A are preferred, especially benzoylperoxide combined with accelerators of the group A, especially dimethylaniline and dimethyl-p-toluidine because by this combination a fast curing can be reached and the shaped material can be cured even at 0° C. Combination of hardening agents B and accelerators B can also be employed, however, a combination of hardening agents B and accelerators B + C is more preferred.

The fastest curing can be attained by the combination of hardening agents A and accelerators A + B. The accelerators of group C are applied in the present of perketals and peresters.

The soil being available at the building ground may have various properties, for example sandy, loamy, marly or calcereous. These properties are negligible, since the method of this invention can be applied to all existing ground varieties. The important factor is only the content of water of the soil because the amount of water-absorbent gypsum to be added depends on it. The water-absorbent gypsum removes by setting the water from the soil and gives the required crumbly dry product after mixing, whereby the curing of the final mixture with the unsaturated polyester resin is facilitated essentially after shaping. According to this invention smaller amounts of water-absorbent gypsum can be employed in the case of lower water content.

The following examples show suitable mixtures for the method of this invention.

| Soil parts by weight | Water content parts by weight | gypsum added parts by weight | unsaturated polyester resin parts by weight |
|---|---|---|---|
| 250 | 45 | 205 | 100 |
| 250 | 37 | 150 | 100 |
| 250 | 30 | 110 | 100 |
| 250 | 25 | 80 | 100 |
| 250 | 20 | 50 | 100 |

The moist soil which is to be shaped and consolidated according to the present process, if it is in a particularly wet state, is first mixed to self-homogenize it, so that it has an average water content of about 20 percent by weight or less, down to about 5 percent by weight. This can in general be achieved by simple mechanical intensive mixing, but additions of dry or moist soil may be required. When the soil to be consolidated displays, fairly homogeneously, a water content of about 20 percent by weight, it does not have to be self-mixed to even out the soil humidity, but can at once be mixed mechanically with excess amounts of water-absorbent pulverulent varieties of gypsum.

The calculation of the excess of the varieties of gypsum can be made on the basis of a simple chemical determination of water in the soil, and taking into account the ability of the variety of gypsum used to bind water. The requisite mixing ratio can, however, also be determined easily and reliably by a practical preliminary test. Here, it does not matter if even large excesses of water-absorbent pulverulent gypsum are used. The excess gypsum is required so that on mixing with the moist soil lumps are not formed and instead a crumbly mixed product, which appears visually and on handling to be "dry," is reliably obtained. Since, during this mixing process, the moisture is bound in the gypsum as water of crystallization, a mixed product is then obtained which can be shaped and hardened by mixing with a polymerizable unsaturated polyester.

Excess amounts of gypsum, which did not set because of lack of water, are bound as filler in the composition after the mixing with the resin-hardening agent mixture.

The amount of polyester, including the copolymerizable monomers and the customary catalysts and accelerators, is added, as a mixture, to the crumbly mixed product in such amounts that a moulding composition is produced in which the proportions of binder must be present in such amounts that the requisite physical properties are reliably obtained after consolidation. If lesser demands are made as to the consolidation of the soil, smaller amounts of unsaturated polyester suffice, whilst if higher requirements are made the proportion of polyester must be appropriately increased. Since the polymerization starts after addition of the mixture of unsaturated polyester and catalysts and accelerators, it is important to carry out the process of mixing with the crumbly soil-gypsum pre-product intensively and rapidly, for which a few minutes generally suffice if appropriate high-output mixing equipment is available. The moulding composition is then spread on the soil, temporary bridge or other suitable substrates and is brought to the desired shape by tamping, rolling or other mechanical working. If the constituents of the moulding composition have been suitably balanced, the consolidated soil can already be utilized after 1 or 2 hours.

In the preferred embodiment of the invention, the procedure followed is that the reaction between the moist soil and the excess amounts of pulverulent gypsum added takes place at temperatures between +5° C and +30° C. The degree to which the variety of gypsum used has been ground is not very critical, though the setting capacity depends thereon, since it is only important that the mixture of moist soil and pulverulent gypsum should give a crumbly, "dry" mixed product.

In order that the desired rapid hardening should occur in the second mixing stage and during shaping of the polyester-soil-gypsum mixed product, the moulding composition should be at the temperature already indicated. If it is necessary to work at lower temperatures, the moulding composition must be brought to these temperatures in a suitable manner, at least during hardening. For examples, this is possible by introducing pipes, through which warm air or warm water is passed, at suitable intervals into the moulding composition. On the other hand, a satisfactory hardening time can be achieved within the low permitted temperature range by changing the amount of catalyst and of accelerator.

Any unsaturated polyester resin which can be hardened sufficiently within the desired time by means of the appropriate catalyst and accelerators, and which imparts the desired mechanical properties to the soil to be consolidated, can be used in the process.

Highly reactive, unsaturated polyesters, together with monomers which yield solutions of low viscosity, such as, for example, unsaturated polyesters based on $\alpha,\beta$-unsaturated aliphatic dicarboxylic acids and a glycol, styrene being preferred as the copolymerizable monomer, are preferred. Benzoyl peroxide, in powder form, has, for example, proved particularly successful as the catalyst.

Dimethylaniline and dimethyl-para-toluidine have proved particularly advantageous as accelerators. In general, from 1 to 4 percent by weight of the catalyst, relative to the weight of the unsaturated polyester, are employed.

If the soil or the gypsum should contain constituents which in one way or another affect the catalysts or accelerators, the amounts should be appropriately increased or reduced in such a way that the effective amount reliably produces the desired action.

The following examples are intended to illustrate the invention:

EXAMPLE 1

Five hundred parts by weight of soil, containing 18 percent by weight of water, and 410 parts by weight of pulverulent, water-absorbent gypsum are converted into a crumbly product over the course of about three minutes by intensive mixing. Two hundred parts by weight of a polymerizable mixture consisting of 108 parts by weight of polyester resin (produced from 1 mol maleic anhydride, 1 mol phthalic anhydride and 2.18 mols propanediol-1,2) and 92 parts by weight styrene stabilized by 0.015 parts by weight hydroquinone, having a viscosity of 120 – 180 cP at 20° C and an acid number of 24, 4 parts by weight benzoylperoxide having a peroxide content of about 50 percent by weight (as the hardening agent) and 2 parts by weight dimethylaniline, 10 percent strength by weight solution in styrene (as the accelerator), are carefully mixed with one another and thereafter mixed with the crumbly product, and after 2 minutes' mixing time the material is spread as a moulding composition on the desired substrate, shaped with a suitable instrument, and smoothed. The working time at 20° C of the moulding composition is about 12 minutes. The spread moulding composition, which is applied to produce a layer about 20 – 30 cm thick, can already be subjected to load, and hence utilized, after a dwell time of 60 minutes at 20° C because it is then fully cured.

EXAMPLE 2

Four hundred and ten parts by weight of soil containing 8 percent of water together with 205 parts by weight of water-absorbent pulverulent gypsum, are worked into a crumbly mixed product and as soon as this is sufficiently crumbly and the major part of the water thus bonded as water of crystallization, the whole is mixed with a previously prepared mixture consisting of: 150 parts by weight of the polymerizable mixture of polyester resin and styrene being described in example 1, 3 parts by weight of benzoyl peroxide, 50 percent peroxide content as the catalyst, and 1.5 parts by weight of dimethylaniline solution (10 percent strength by weight in styrene, as the accelerator).

After 3 minutes' mixing time, the moulding composition is spread on the soil and appropriately shaped and smoothed. The time for working the composition is approx. 20 minutes at 20° C. Thereafter, following 90 minutes at 20° C ambient temperature, the hardened covering can be utilized.

EXAMPLE 3

Five hundred parts by weight of soil containing 10 percent by weight of water and 200 parts by weight of water-absorbent pulverulent gypsum are worked into a crumbly mixed product during 3 minutes. One hundred and fifty parts by weight of the polymerizable mixture of polyester resin and styrene being described in example 1, 1.5 parts by weight dimethylaniline solution (10 percent strength by weight in styrene) and 3 parts by weight benzoylperoxide (50 percent by weight peroxide content) are mixed carefully with one another and thereafter mixed with the crumbly product and after 2 minutes' mixing time the material is spread as a moulding composition on the described substrate, shaped with a suitable instrument and smoothed.

The working time at 20° C of the moulding composition is about 12 minutes. The spread moulding composition which is applied to produce a layer about 20 – 30 cm thick, can already be subjected to load, and hence utilized, after a dwell time of 60 minutes at 20° C.

EXAMPLE 4

One hundred and fifty parts by weight of soil, containing 12 percent by weight of water and 50 parts by weight water-absorbent pulverulent gypsum are converted into a crumbly mixed product and as soon as this is sufficiently crumbly and the major part of the water thus bonded as water of crystallization, the whole is mixed with a previously prepared mixture consisting of: 100 parts by weight of the polymerizable mixture of polyester resin and styrene being described in example 1, 0.3 parts by weight of cobalt octoate solution in styrene (1 percent by weight of cobalt) and 3 parts by weight of methylethylketone peroxide 50 percent by weight in plasticizer.

After 3 minutes' mixing time the moulding composition is spread on the soil and accordingly shaped and smoothed. The working time is at 20° C about 20 minutes. After 90 minutes at 20° C the cured composition can be utilized.

EXAMPLE 5

Two hundred parts by weight of soil containing 15 percent by weight of water and 80 parts by weight water-absorbent, pulverulent gypsum are converted into a crumbly mixed product and as soon as this is sufficiently crumbly and the major part of the water thus bonded as water of crystallization, the whole is mixed with a previously prepared mixture consisting of: 100 parts by weight of a self-extinguishable resin consisting of 53 parts by weight of polyester resin (produced of 1 mol maleic anhydride, 1 mol phthalic anhydride and 2.18 mols propanediol-1,2) and 23 parts by weight styrene stabilized with 0.015 parts by weight hydroquinone, having a viscosity of about 2,200 cP at 20° C and an acid number of 30, 20 parts by weight chloroparaffine (chloride content 70 percent by weight) and 4 parts by weight antimony trioxide, 2 parts by weight benzoylperoxide (50 percent by weight peroxide content), 2 parts by weight dimethylaniline (10 percent strength by weight solution).

After 3 minutes' mixing time the moulding composition is spread on the soil and shaped and smoothed. The working time at 20° C is about 20 minutes. After 90 minutes at 20° C the cured moulding composition can be utilized.

EXAMPLES 6 – 10

The instructions given in examples 1 – 5 are followed, yet a commercial ceratine setting retarding agent is added to the gypsum before the mixing of the gypsum and the moist soil. By the addition of various amounts of this retarding agent a setting time of 5 to 60 minutes of the water-absorbent gypsum is obtained. Further treatment of the obtained crumbly mixed product is done as being described in examples 1 – 5. The addition of the retarding agent does not have any disadvantageous effect on the obtained end product.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What we claim is:

1. A process for shaping and rapidly consolidating moist soil, which comprises,
   a. mixing moist soil having a water content of about 5 to 20 percent by weight with 5 to 100 parts by weight of water-absorbent, pulverulent varieties of gypsum for such period of time that a crumbly mixed product is obtained,
   b. mixing the resulting mixture with a mixture of polymerizable unsaturated polyesters, hardening agents and accelerators in the weight ratio of 3 : 1 to 10 : 1 to give a mass which can be shaped, and,
   c. thereafter shaping the resulting mass and allowing the consolidation thereof.

2. Process according to claim 1, wherein the mixing of the soil gypsum mixture and the mixture of polymerizable unsaturated polyester, hardening agent and accelerators is carried out in the weight ratio of 5 : 1.

3. Process according to claim 1, wherein the hardening agent employed is selected from the group consisting of diacylperoxides such as dichlorobenzoylperoxide and benzoylperoxide, and ketone peroxides such as methylethylketone peroxide, methylisobutylketone peroxide, cyclohexane peroxide, and acetylacetone peroxide.

4. Process according to claim 1, wherein the accelerator employed is selected from the group consisting of tertiary amines such as dimethylaniline, diethylaniline, dimethyl-para-toluidine, and metal salts such as cobalt (II) octoate, cobalt (II) naphthenate and vanadyl-p-toluenesulfonate.

5. Process according to claim 1, wherein the unsaturated polyester employed is based on $\alpha, \beta$-unsaturated aliphatic dicarboxylic acids, a glycol and styrene.

6. Process according to claim 3, wherein the hardening agent is benzoylperoxide.

7. Process according to claim 4, wherein the accelerator employed is dimethylaniline or dimethyl-p-toluidine.

* * * * *